(12) United States Patent
Noritake

(10) Patent No.: US 6,330,891 B1
(45) Date of Patent: Dec. 18, 2001

(54) DOUBLE-DAMPER APPARATUS

(75) Inventor: Seiichiro Noritake, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/553,558

(22) Filed: Apr. 20, 2000

(30) Foreign Application Priority Data

Apr. 22, 1999 (JP) .................................................. 11-115379

(51) Int. Cl.⁷ .................................................. F16K 11/22
(52) U.S. Cl. .................... 137/595; 137/601.05; 137/870; 137/871; 62/187
(58) Field of Search .......................... 137/601.05, 601.14, 137/595, 870, 871; 62/186, 187

(56) References Cited

U.S. PATENT DOCUMENTS

| | | | |
|---|---|---|---|
| 2,699,106 | * | 1/1955 | Hoyer ................................. 137/870 X |
| 3,248,893 | * | 5/1966 | McLean . | |
| 3,486,347 | * | 12/1969 | Gidseg . | |
| 5,048,577 | * | 9/1991 | Kuusisto .......................... 137/595 X |
| 6,058,726 | * | 5/2000 | Noritake ................................. 62/186 |
| 6,069,466 | * | 5/2000 | Noritake et al. ...................... 318/685 |

FOREIGN PATENT DOCUMENTS 10-306970  11/1998  (JP) ................................. F25D/17/08

\* cited by examiner

*Primary Examiner*—Stephen Hepperle
(74) *Attorney, Agent, or Firm*—Sughrue, Mion, Zinn, Macpeak & Seas, PLLC

(57) ABSTRACT

In a double-damper apparatus 1 including a driving portion (2), two frame portions (3 and 4) arranged on both sides of the driving portion, and two open/close members (5 and 6) which are coupled with the driving portion (2) and perform the operation of opening/closing the openings (31 and 41) formed in the frame portions respectively by the driving force of the driving portion, a steps(s) β is formed between the flat portions (37b and 47b) of the two frame portions (3 and 4). A labyrinth structure is formed between both flat portions (37b and 47b) to prevent leakage of fluid between both fluid channels.

4 Claims, 7 Drawing Sheets

US 6,330,891 B1

DOUBLE-DAMPER APPARATUS

BACKGROUND OF INVENTION

FIELD OF THE INVENTION

The present invention relates to a double-damper apparatus for operating opening/closing plates such as baffles for two openings using a driving source such as a motor, and more particularly to a double-damper apparatus suited to control intake of cool air in a refrigerator.

A duct (passage) for supplying cool air in a freezer compartment into a refrigerator compartment or a crisper is provided on the rear of a refrigerator. Conventionally, in order to adjust the temperature in a chamber such as a refrigerator compartment, within the duct, a damper apparatus is provided for passing/interrupting the cool air in the freezer compartment for the refrigerator compartment. Further, a double-damper apparatus capable of passing/interrupting the cool air for two chambers by a single apparatus has been also disclosed (JP-A-10-306970). These damper apparatus are driven under the control by a microcomputer arranged in the freezer compartment.

The double-damper apparatus disclosed in JP-A-10-306970, which is a prior art for the present invention, as shown in FIGS. 8 and 9, includes a driving portion 51 incorporating a motor (not shown), two frame portions 52 and 53 arranged on both sides of the driving portion 51, and two open/close members 54 and 55 which are coupled with the driving portion 51 and rotated by the driving force of the driving portion 51. The frame portions 52 and 53 have openings 56 and 57, respectively, which are inlets of fluid channels to other chambers (e.g. refrigerator compartment and crisper). The one open/close member 54 individually opens/closes the opening 56 whereas the other open/close member 55 individually opens/closes the opening 57. Thus, the cool air is passed to or interrupted from each chamber.

However, if the fitting of the damper apparatus built in each fluid channel in the heat-insulating member 60 is loosened slightly, the sealing property of the abutting portion α on the heat-insulating member 60 (FIG. 9) will be deteriorated. Specifically, since the heat-insulating member 60 is formed of Styrofoam, the size of the slot for fitting the double-damper cannot be defined so precisely. As a result, a gap g is generated between the damper apparatus and heat-insulating member. This gap g connects both fluid channels linearly. As a result, the cool air on the one fluid channel is likely to leak into the other fluid channel (direction of arrow X–X' in FIG. 8), thus proving a problem for managing the temperature in each chamber.

However, if the fitting of the damper apparatus built in each fluid channel in the heat-insulating member 60 is loosened slightly, the sealing property of the abutting portion α on the heat-insulating member 60 (FIG. 9) will be deteriorated. Specifically, since the heat-insulating member 60 is formed of Styrofoam, the size of the slot for fitting the double-damper cannot be defined so precisely. As a result, a gap g is generated between the damper apparatus and heat-insulating member. This gap g connects both fluid channels linearly. As a result, the cool air on the one fluid channel is likely to leak into the other fluid channel (direction of arrow X–X' in FIG. 8), thus proving a hitch of managing the temperature in each chamber.

SUMMARY OF INVENTION

An object of the present invention is to provide a double-damper apparatus operative to interrupt leakage of cool air which is apt to occur when being built in a duct of a refrigerator together with a heat-insulating member, i.e., leakage (flow) of the cool air from the one fluid channel to the other passage is prevented, and hence respective chambers are cooled with good energy efficiency and the temperature of each of the chambers is managed.

In order to attain the above object, in the present invention, in a double-damper apparatus comprising a driving portion, two cylindrical frame portions arranged on both sides of the driving portion, and two open/close members which are coupled with the driving portion and perform the operation of opening/closing openings formed in the frame portions, respectively by the driving force of the driving portion, a step is formed between the flat portions of the two frame portions.

Because of the step formed between the flat portions of the two frame portions, the faces of both frame portions constitute a kind of labyrinth structure. Therefore, even in if a gap is formed between the double-damper apparatus and heat-insulating member, the creeping distance of the gap is increased. As a result, cool air is hindered from leaking from the one fluid channel to the other fluid channel to the other fluid channel through the gap between the double-damper and the heat-insulating member fit therein.

In addition to the above invention, in another invention, the step is provided at two positions at the boundaries between the driving portion and the two frame portions so that the one face of the driving portion is convex or concave from flat portions of the two frame portions. Because of this configuration, it is possible to fit the heat-insulating member for sectioning the two fluid channels in the double-damper apparatus surely and intimately using the convex or concave portion. Incidentally, where the step is convex, the heat-insulating member of material having small strength such as Styrofoam can be made concave. The heat-insulating member having the concave shape is more difficult to break than that having the convex shape.

In addition to each of the above inventions, in still another invention, the step is formed in a plane in parallel to the direction of the fluid flowing through the openings. By providing the step in the flowing direction of fluid, the leakage of the fluid from the one fluid channel to the other fluid channel is surely interrupted over a prescribed fluid channel length so that the fluid can be passed effectively.

In addition to each of the above aspects of the invention, in still another invention, the step is formed in a plane in parallel to the concave or convex portion formed by the step and is engaged with a heat-insulating member for sectioning two passages which the two openings enter. Because of such a structure, the heat-insulating member can be surely fit in the concave or convex portion so that the leakage of fluid can be surely interrupted.

In addition to each of the above aspects of the invention, in a further aspect, the driving portion is arranged between the two frame portions so that the one face of the driving portion is convex from the flat portions of the frame portions, and the convex portion of the driving portion is a hollow portion where no mechanical component for driving is arranged. Because of such structure, in addition to the function of preventing the leakage of fluid and breakage of the heat-insulating member, the hollow portion can be employed to make wiring for power supply and can be employed as a part of the heat-insulating portion.

In addition to each of the above aspects, in a further aspect of the invention, the driving portion is arranged between the two frame portions so that the one face of the driving portion is concave from the flat portion of the frame portions, and a power supplying member to the driving portion is arranged in the concave portion of the driving portion. Because of such a structure, in addition to the function of preventing the leakage of fluid, the concave portion (recessed portion) can be employed to route the wiring.

BRIEF DESCRIPTION OF DRAWINGS

In FIG. 1, the baffle on the left side is in an opened state whereas that on the right side is in a closed state.

In FIG. 8, the baffle on the left side is in an opened state whereas that on the right side is in a closed state.

DETAILED DESCRIPTION OF PREFERRED EMBODIMENTS

Figure 4:
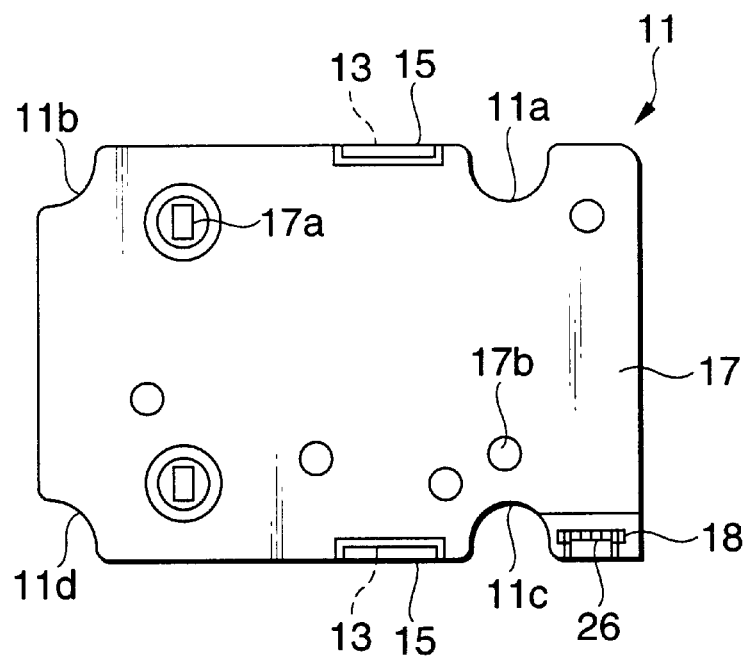
FIG. 4 is a view when only the driving portion shown in FIG. 1 is viewed from the direction of arrow IV.
Figure 5:
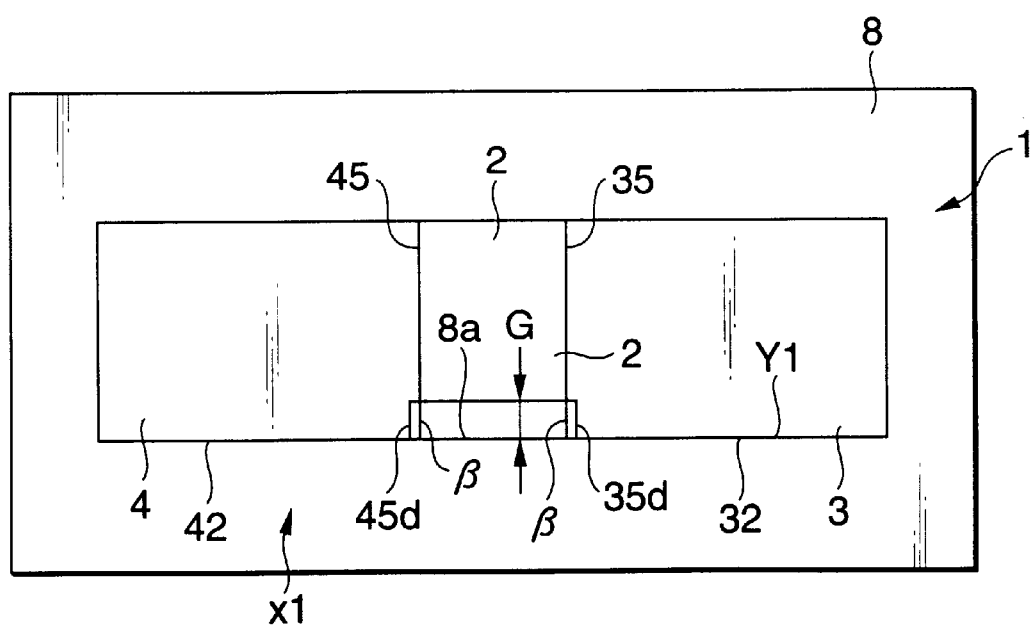
FIG. 5 is a schematic view of a modification of the double-damper apparatus according to the embodiment.

Now referring to FIGS. 1 and 4, an explanation will be given of an embodiment of the double-damper apparatus according to the invention. It should be noted that the double-damper apparatus according to this embodiment is a motor-drive type damper apparatus which is employed in a refrigerator and driven by a motor.

Figure 1:
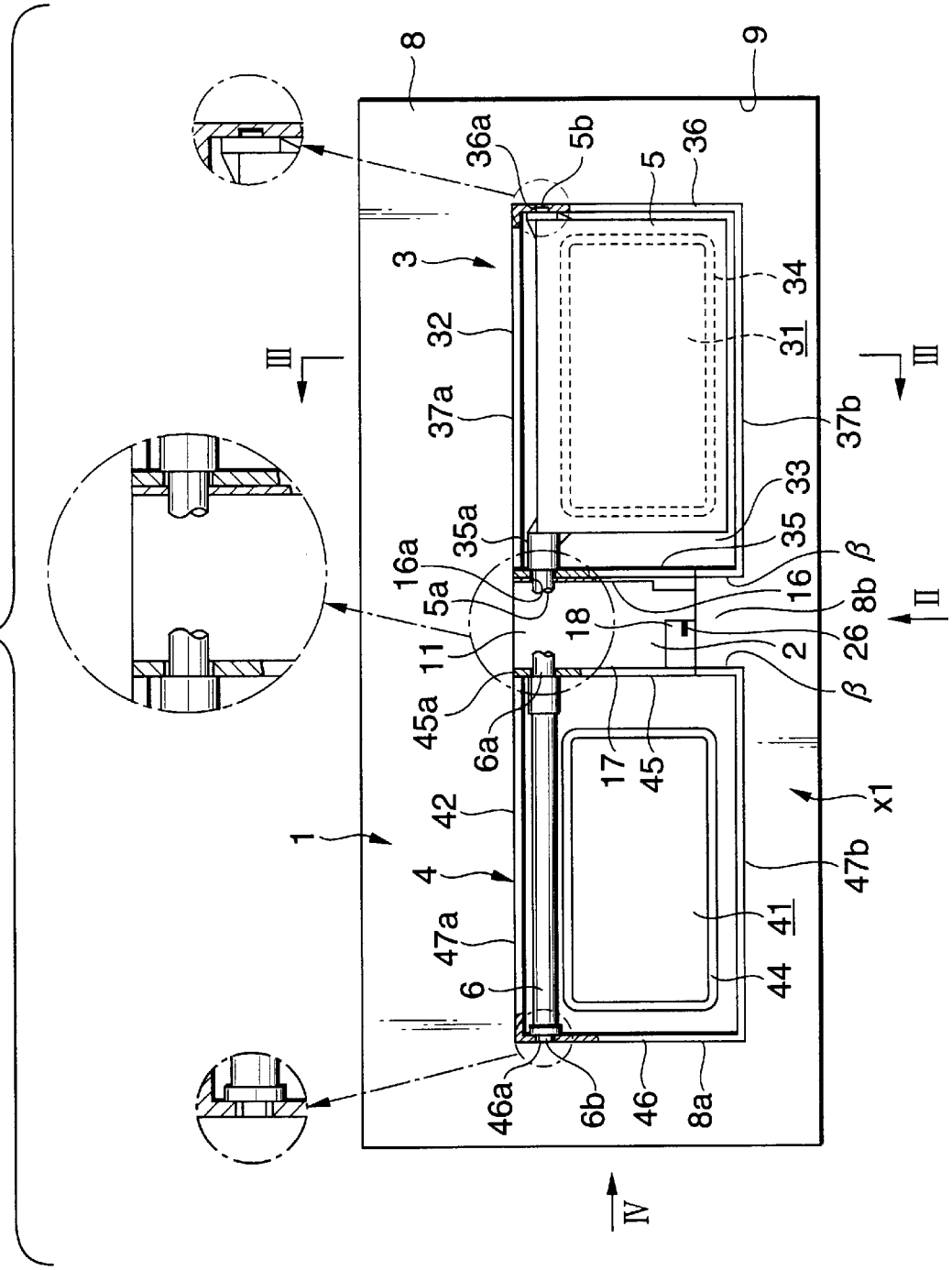
FIG. 1 is a front view of a double-damper apparatus according to an embodiment of the present invention.
Figure 2:
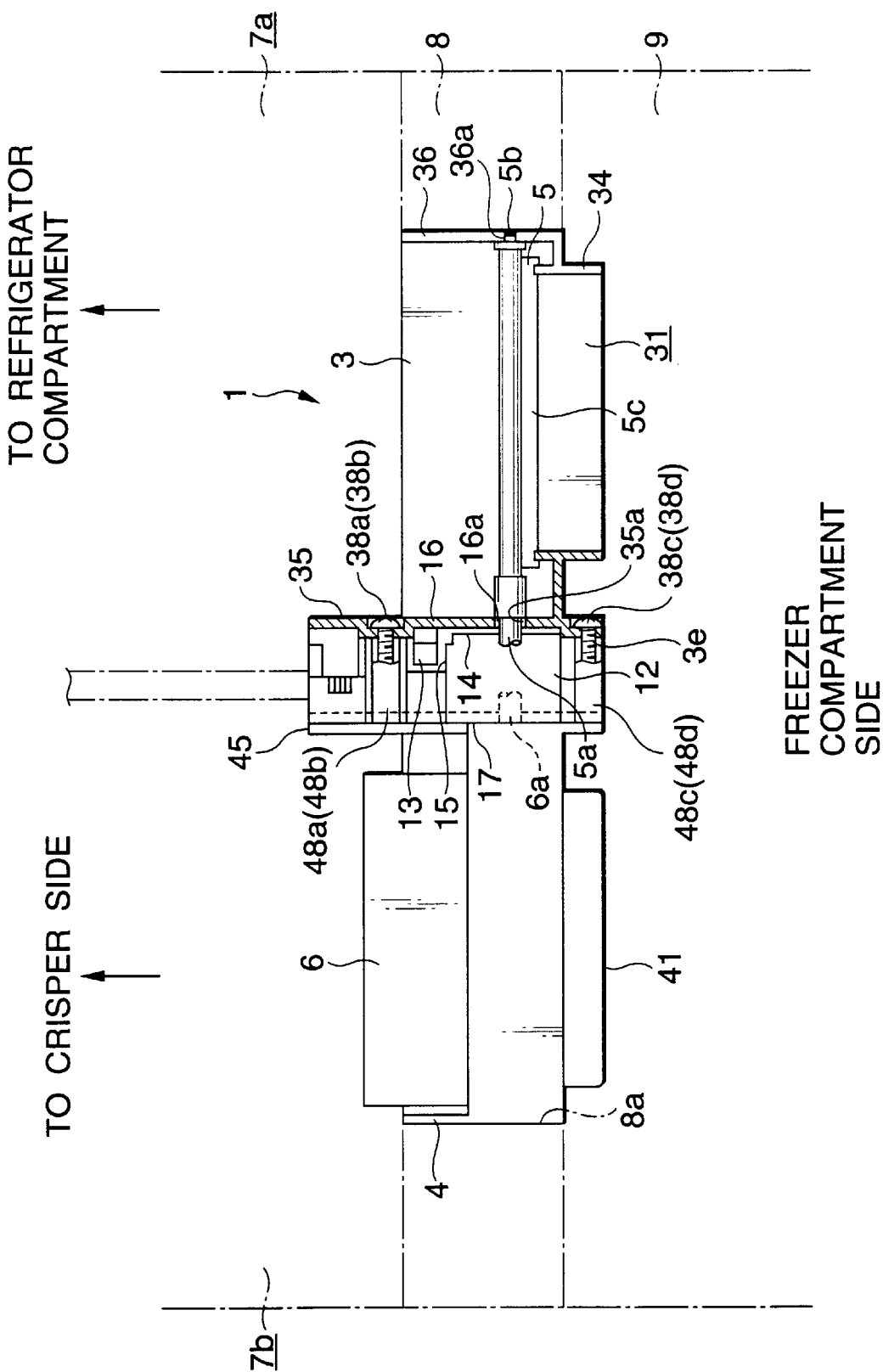
FIG. 2 is a partial sectional view of the double-damper apparatus shown in FIG. 1, when viewed from the direction of arrow II.

A double-damper apparatus 1 according to this embodiment, as seen from FIGS. 1 and 2, includes a driving portion 2, two resin frame portions 3 and 4 arranged on both sides of the driving portion 2, and baffles 5 and 6 whose both ends are supported by the frame portions 3 and 4 and which are rotated by the driving force by the driving portion 2.

The frame portions 3 and 4 have openings 31 and 41, respectively. When the baffles 5 and 6 are operated by the driving force of the driving portion 2, the openings 31 and 41 are opened or closed. Both the openings 31 and 41 are adapted to be communicated with a freezer compartment (not shown) of a refrigerator. In addition, the frame portions 3 and 4 are attached to the refrigerator in such a manner that the opening 31 serves as an inlet of a cool air fluid channel 7a to a refrigerator compartment and the opening 41 serves as an inlet of a cool air fluid channel 7b to a crisper. Therefore, the baffles 5 and 6 also serve as valves for temperature-adjusting different chambers, respectively.

The double-damper apparatus 1, being fit in a slot 8a of a heat-insulating member 8, is arranged within a duct 9 of the refrigerator together with the heat-insulating member 8. The heat-insulating member 8 serves to separate the fluid between the side of a freezer compartment and the side of a refrigerator compartment and a crisper, and to separate the fluid between the fluid channel 7a guided to the freezer compartment and the fluid channel 7b guided to the crisper.

The driving portion 2 serves to rotate two baffles 5 and 6 individually, and houses an internal mechanism for driving, i.e. a stepping motor and a chain of tooth wheels (not shown) inclusive of two output shafts operable individually in a rectangular resin case body 11. As for the case body 11, as seen from FIG. 2, a cup-shaped member 12 and a cover member 14 are integrated to each other in such a manner that lugs 15, 15 formed in a cover member 14 are engaged with protrusions 13, 13 formed in the cup-shaped member 12. The double-damper apparatus according to this embodiment is formed so that with both sides 16 and 17 of the driving portion 2 being sandwiched by both frame portions 3 and 4, both frame portions 3 and 4 are secured by screws.

The one frame portion 3, as seen from FIG. 1, includes a rectangular outer frame 32, an interrupting face 33 provided on the inner face of the outer frame 32 so as to be orthogonal to the outer frame 32, an opening 31 in the interrupting face 33, and a portion 34 formed at the outer edge of the opening 31 so as to be orthogonal to the interrupting face 33 to protrude from both sides of the interrupting face 33. The outer frame 32 includes an abutting face 35 to abut on the one side 16 of the driving portion 2, an opposite face 36 located at a position opposite to the abutting face 35, and coupling faces 37a and 37b for coupling the abutting face 35 and the opposite face 36 with each other. The abutting face 36 has a passing hole 35a for passing the one spindle 5a of the baffle 5. The opposite face 36 has a bottomed hole 36a in which the other spindle of the baffle 5 is rotatably fit. The coupling faces 37a and 37b form flat faces. opposite to the abutting face 35, and coupling faces 37a and 37b for coupling the abutting face 35 and the opposite face 36 with each other. The abutting face 36 has a passing hole 35a for passing the one spindle 5a of the baffle 5. The opposite face 36 has a bottomed hole 36a in which the other spindle of the baffle 5 is rotatably fit. The coupling faces 37a and 37b form flat faces.

In this configuration, the frame portion 3 causes the abutting face to abut on the driving portion 2 in a state where the one spindle 5a of the baffle 5 is protruded from the abutting face 35, and causes the protruding spindle 5a to be fit in a fitting hole 16a formed on the one side 16 of the driving portion 2. Thus, the baffle 5 is coupled with the driving portion 2. The tip of the spindle 5a of the baffle 5 is fit into the one output shaft (not shown) of the driving portion in the fitting hole 16a. Therefore, the baffle 5 rotates within the outer frame 32 of the frame portion 3 while it is supported by the frame portion 3 by the driving force of the driving portion 2.

Figure 3:
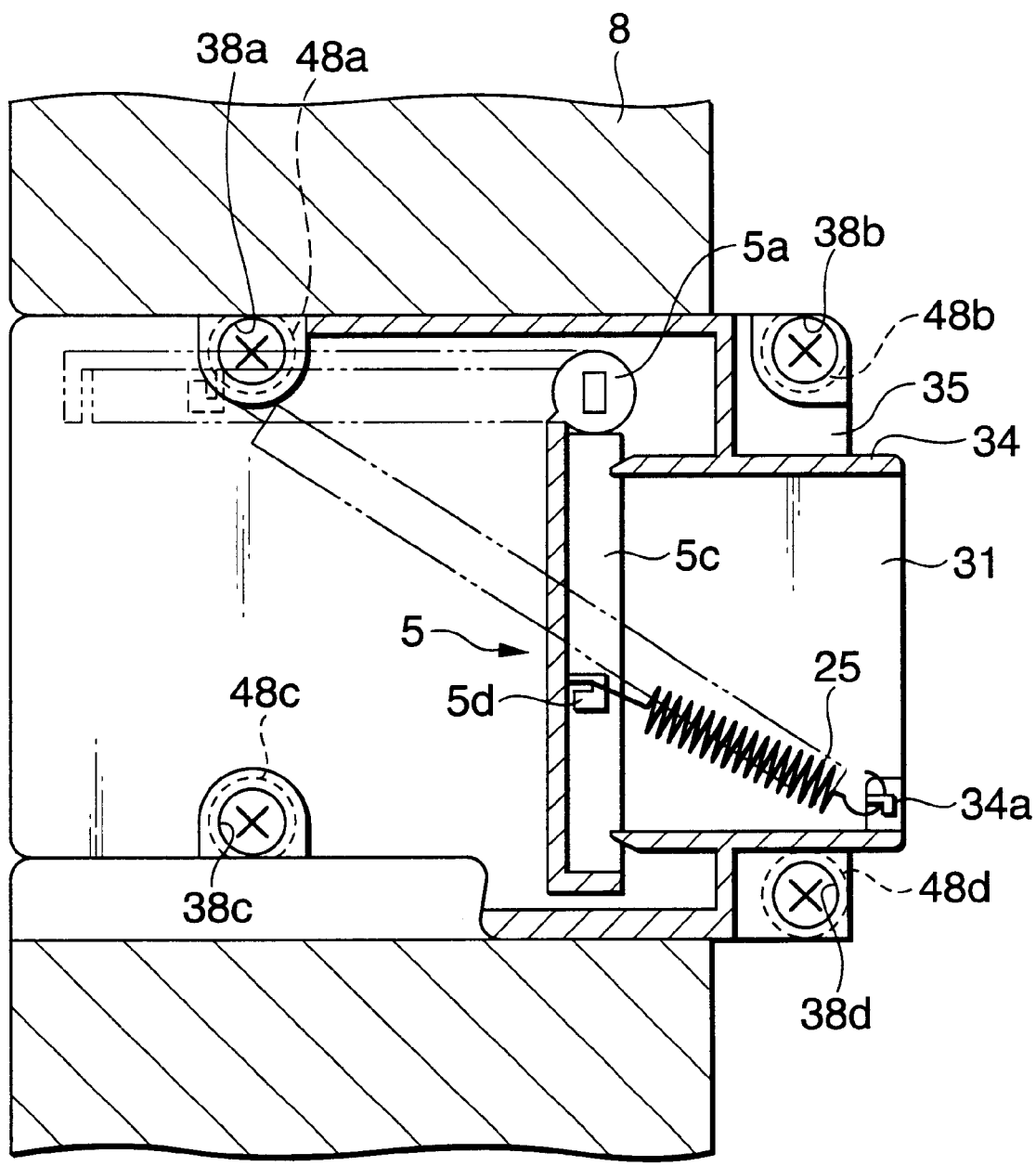
FIG. 3 is a sectional view taken in line III–III of FIG 1.

The baffle 5 supported by the frame portion 3 is a plate member which rotates around spindles 5a and 5b. The baffle 4 is affixed with a soft tape 5c on its one side (FIG. 3). At a position apart by a prescribed distance from the rotating fulcrum on the one side of the baffle 5, a securing portion 5d is provided for securing the one end of a coil spring 25. The other end of the coil spring is secured to a securing portion 34a provided inside a cylinder 34 of the frame portion 3. The baffle 5 is urged always by urging force of the coil spring 25.

The other frame portion 4 is arranged symmetrically to the one frame portion 3 with respect to the driving portion 2. The frame portion 4 has the same configuration as the frame portion 3 except an abutting face 45 abutting on the driving portion 2. A baffle 6 which is rotatably supported by the frame portion 4 has also the same configuration as the baffle 5.

On the one side of the abutting face 45 of the other frame portion 4, a boss (not shown) which is fit in a positioning hole 17b provided on the other side 17 of the driving portion 2. This boss and the one spindle 6a of the baffle 6 arranged symmetrically to the baffle 5 constitute a positioning member for the driving portion 2 of the frame portion 4. Likewise, a boss for positioning is provided in the one frame portion 3.

On the one side of the abutting face 45 of the other frame portion 4 thus formed, as seen from FIGS. 2 and 3, screwing columns 48a, 48b, 48c and 48d extend out to the one frame portion 3 from the driving portion 2. The columns 48a, 48b, 48c and 48d have screwing holes at their tips, respectively. The one frame portion 3 has screwing holes 37a, 38b, 38c and 38d in its abutting face 35. With the driving portion 2 sandwiched by both frame portions 3 and 4, screw-securing is made between the screwing holes of the columns 48a, 48b, 48c, and 48d on the side of the other frame portion 4 and the screwing holes 38a, 38b, 38c and 38d formed on the abutting face 35 of the one frame portion 3. Thus, both frame portions 3 and 4 are secured on both sides of the driving portion 2.

The case body 11 constituting the driving portion 2 has recesses 11a, 1b, 11c and 11d formed to be recessed internally on its outer periphery. These recesses 11a, 11b, 11c and 11d serve as clearance portions for passing the columns 48a, 48b, 48c and 48d from the other frame portion 4 into the one frame portion 3. A lead wire extending portion 18 for extending the lead wire 26 is formed in the vicinity of one recess 11a of these four recesses.

In the double-damper apparatus 1 according to this embodiment, as seen from FIG. 1, two steps β are formed between these two steps. Incidentally, since the driving portion 2 is attached to both frame portions 3 and 4 to form the two steps β, these steps are formed at the boundaries between the driving portion and the frame portions. These two steps β are provided on the one of the planes in parallel to the fluid which passes through the openings 31 and 41 of the double-damper apparatus and flows through the fluid channels 7a and 7b, i.e. in a plane X1 on the side provided with a lead wire extending portion 18 of the driving portion 1. Thus, the one side of the driving portion 2 on the plane X1 is recessed with respect to the flat portions (corresponding to 37b and 47b) of the outer frames 32 and 42 of both frame portions 3 and 4.

A fitting convex] protrusion portion 8b of the heat-insulating member 8 is fit into the recesses portion (recessed portion). Specifically, the fitting protrusion portion 8b formed so as to protrude internally is provided in the slot 8a of the heat-insulating member 8. The double-damper apparatus 1 is fit into the slot portion 8a of the heat-insulating member 8 in such a manner that the recessed portion of the double-damper apparatus 1 is fit over the fitting protrusion portion 8b. Such a structure constitutes a kind of labyrinth structure. The distance of the abutting face between the heat-insulating member 8 and the double-damper apparatus at this recessed portion is longer than the that therebetween in a flat state. Thus, in consideration of the plane X1 where the recessed portion described above is formed, the slot 8b suppresses the flow of cool air, so that the flow of cool air from the fluid channel 7a to fluid channel 7b is hindered. 8 is fit into the recessed portion (concave portion). Specifically, the fitting convex portion 8b formed so as to protrude internally is provided in the hole portion 8b of the heat-insulating member 8. The double-damper apparatus 1 is fit into the slot portion 8a of the heat-insulating member 8 in such a manner that the concave portion of the double-damper apparatus 1 is fit over the fitting convex portion 8b. Such a structure constitutes a kind of labyrinth structure. The distance of the abutting face between the heat-insulating member 8 and the double-damper apparatus at this concave portion is longer than that therebetween in a flat state. Therefore, flow-out of the cool air is impeded on the plane X1 where the concave portion formed so that the cool air in the one fluid channel is difficult to flow to the other fluid channel.

Specifically, even if a gap is formed in an abutting face between the heat-insulating member 8 and the double-damper apparatus 1 of the rigid body, the air flow through the gap from the one opening 31 or 41 to the other opening or 31 can be impeded.

The embodiment described above is a preferred embodiment of the present invention. The present invention should not be limited to this embodiment, but can be realized in several modifications without departing from the spirit of the invention. For example, in the double-damper apparatus 1 according to this embodiment, the two steps β are formed on the side of the plane X where the lead wire extending portion 18 is formed so that the recessed portion is formed, thereby preventing the flow-out (leakage) of the cool air at this recessed portion. However, only one step β may be formed between the frame portions 3 and 4, and the recessed portion is not necessarily required. air at this concave portion. However, only one step β may be formed between the frame portions 3 and 4, and the concave portion is not necessarily required.

Where the fitting protrusion portion 8b which is to be fit into the recessed portion of the double-damper apparatus 1 is not formed, a gap G is formed between the driving portion 2 and heat-insulating member 8. In this case, ribs 35d and 45d are formed to protrude the respective abutting faces 35 and 45 toward the heat-insulating member 8 so that their tips are brought into contact with the heat-insulating member 8. Thus, the leakage of the cool air from the gap G can be prevented. If the power supply member such as lead wires is arranged in the gap G, no recessed portion is required for passing the lead wires to the heat-insulating members.

Alternatively, the ribs 35d, 45d may be provided together with the structure in which the fitting protrusion 8b is fit into the recessed portion of the double-damper apparatus 1.

Figure 6:
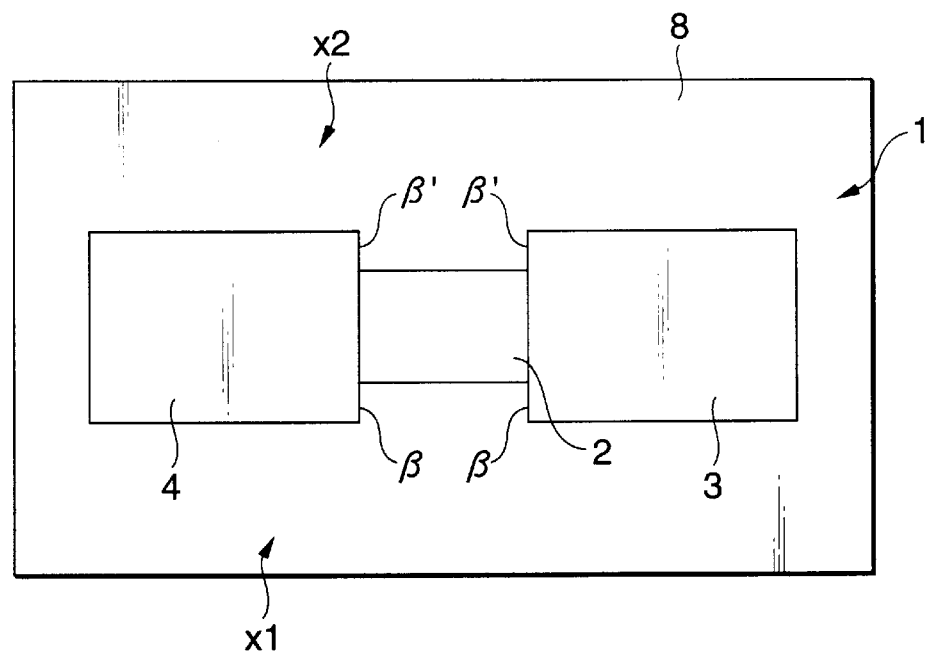
FIG. 6 is a schematic view of another modification of the double-damper apparatus according to the embodiment.

In the double-damper apparatus 1 described above, the recessed portion is formed on only the side of the plane X1 so that the flow-out (leakage) of the cool air can be prevented. However, as seen from FIG. 6, two steps β' may also be formed on the side of the plane X2 opposite to the plane X1 so that the flow-out of the cool air on the side of the plane X2 can be prevented like the side of the plane X1. The number of the steps β' may be one or three or more to form a more complicate labyrinth structure.

Incidentally, in the above described structure of the double-damper apparatus in which the recessed portion is formed on only the side of the plane X1 and the side of the plane X2 opposite to the plane X1 is linear and the slot 8a of the heat-insulating member 8 is caused to have the outer shape of the double-damper apparatus 1 (i.e. the fitting protrusion portion 8b is provided in the slot 8a ), a worker can avoid an error in a fitting direction when the double-damper apparatus is fit into the heat-insulating member 8.

In the double-damper apparatus 1 described above, apparently, in FIG. 1, the front surface (where the baffles 5 and 6 are provided) can be easily distinguished from the rear surface, but the left and right portions cannot be easily be distinguished from each other because they are symmetrical. Therefore, there is a danger of erroneously fitting the right and left portions. If the right and left portions of the double-damper apparatus are erroneously fit into the heat-insulating member 8, the baffle on the opposite side will be opened/closed under the control of a microcomputer to generate a problem in control. However, the structure in which the one plane is flat and the other plane has the concave or convex portion can prevent an error in the fitting direction.

In the structure in which the one side is flat, the holes (passing holes 35a, 45a in the above embodiment) into which the spindles 5a and 6a of the baffles 5 and 6 are inserted can be formed in the vicinity of the linear plane. For this reason, the area rate of the openings 31 and 41 to the entire area of the frame portions 3 and 4 can be taken as a large value. This make the flow of the cool air efficient.

In the double-damper apparatus 1 according to this embodiment, the steps β are provided on the plane X1 which is in parallel to the direction of flow of the cool air. However, the step may be formed in the plane perpendicular to the direction of flow of the cool air, i.e. front-to-back direction. In this case, the labyrinth structure is formed in the front-to-back direction of the double-damper apparatus 1, i.e. between the one side guided to the duct communicating with the freezer compartment and the other side guided to the fluid channel communicating with different chambers so that the cool air of the freezer compartment on the one side is difficult to flow toward the fluid channel on the other side.

Figure 7:
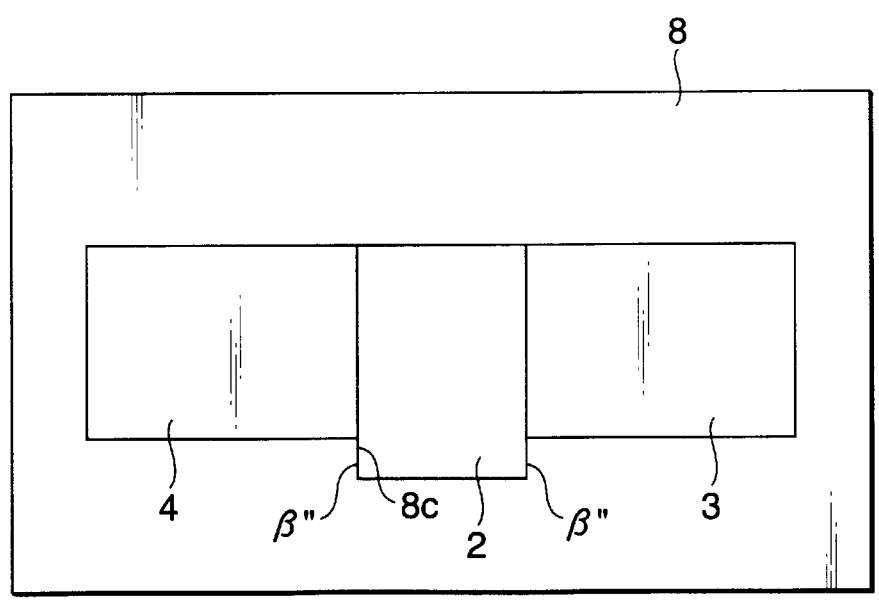
FIG. 7 is a schematic view of another modification of the double-damper apparatus according to the embodiment.
Figure 8:
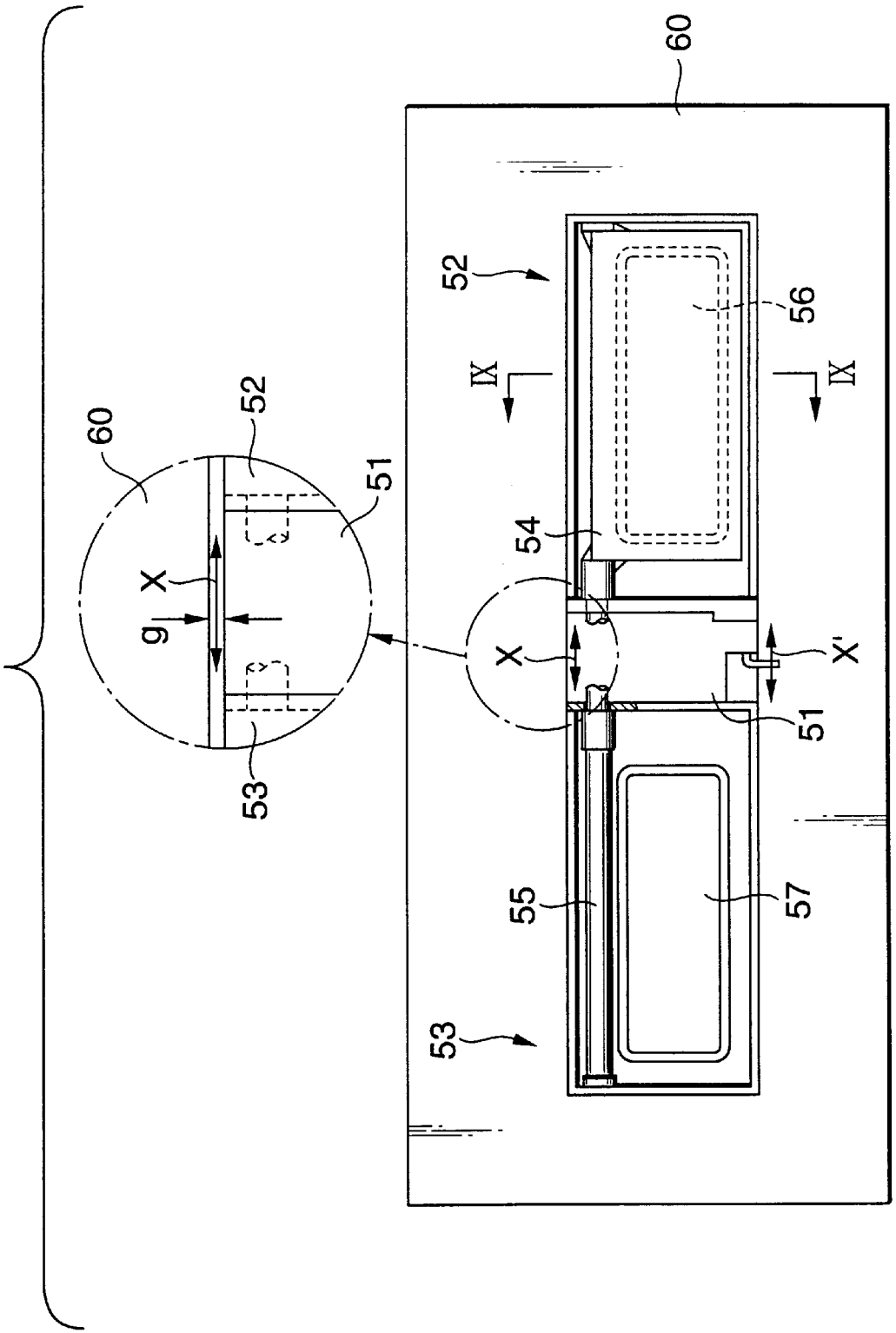
FIG. 8 is a front view of a conventional double-damper apparatus.
Figure 9:
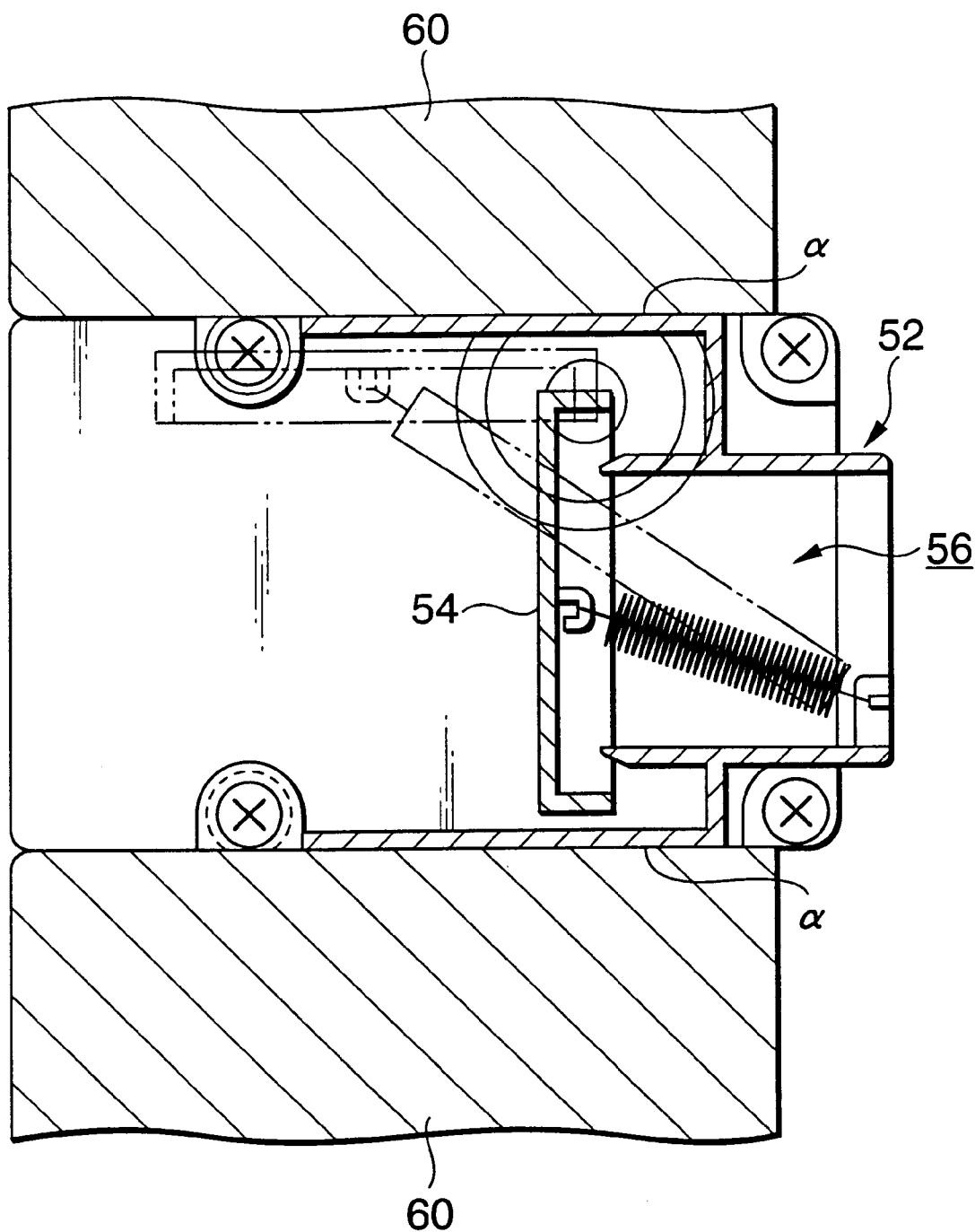
FIG. 9 is a sectional view taken in line IX–IX of FIG. 8.

In the double-damper apparatus 1 described above, two steps β are provided so that the one plane of the driving portion 2 is concave with respect to the one face of both frame portions 3 and 4. However, as seen from FIG. 7, the driving portion 2 may be attached to both frame portions 3 and 4 so that the one face of the former projects with respect to the one face of the latter, thereby forming steps β" which constitute a labyrinth structure together with the heat-insulating member 8.

Where the double-damper apparatus 1 having such a structure is formed, the internal mechanism of the driving portion 2 and both frame portions 3 and 4 may be formed in the configuration described above, and only the size of the case body 1 may be increased so that the interior of the driving portion protruding from both frame portions 3 and 4 is hollow. In such a configuration, the size of the case body according to the embodiment described above has only to be changed to make the driving portion 2 convex with respect to both frame portions 3 and 4. The power supply member such as a lead wire may be arranged in the hollow portion of the case body 11, and the hollow portion itself can be employed as a heat-insulating portion.

In the above embodiment described above, the double-damper apparatus 1 was fit into the duct 9 of the refrigerator. However, it can be installed to not only the refrigerator but also the other apparatus.

As understood from the description hitherto made, the double-damper apparatus according to the invention includes a driving portion, two frame portions arranged on both sides of the driving portion, and two open/close members which are coupled with the driving portion and perform the operation of opening/closing the openings formed in the frame portions, respectively by the driving force of the driving portion. A step(s) is formed between the flat portions of the two frame portions. Therefore, fitting the double-damper apparatus in the heat-insulating member constitutes a labyrinth structure so that the creeping distance on a prescribed plane between both frame portions (a part of the abutting face on the heat-insulating member) is increased. As a result, the leakage of the fluid such as a cool air from the gap formed between the double-damper apparatus and the heat-insulating member can be prevented. Accordingly, the respective chambers guided to the openings can be cooled with good energy efficiency, and the temperature management of the respective chambers can be easily performed. Further, the steps may be employed to arrange the power supply member, or may be used as a mark when the double-damper apparatus is attached to any appliance.

What is claimed is:

1. A double-damper apparatus comprising:

a driving portion;

two frame portions arranged on both sides of the driving portion;

two open/close members coupled with the driving portion and performing the operation of opening/closing openings formed in the frame portions, respectively by the driving force of the driving portion; and a step portion formed between flat portions of the two frame portions, wherein said step portion has a plane parallel to the direction of the fluid flowing through said openings, and one of a recessed portion and a protruding portion formed by said step portion is engaged with a heat-insulating member for sectioning two fluid channels in which said two openings enter.

2. A double-damper apparatus according to claim 1, wherein said step portion is provided at two positions at boundaries defined between said driving portion and said two frame portions so that the one face of said driving portion is recessed away from or protruding toward said flat portions of said two frame portions.

3. A double-damper apparatus according to claim 1, wherein said driving portion is arranged between said two frame portions so that the one face of said driving portion protrudes toward said flat portions of said frame portions, and said one face of said driving portion is a hollow portion where no mechanical component for driving is arranged.

4. A double-damper apparatus according to claim 1, wherein said driving portion is arranged between said two frame portions so that the one face of said driving portion is recessed away from the flat portions of said frame portions to form a recessed portion, and a power supplying member to the driving portion is arranged in the recessed portion of said driving portion.

* * * * *